United States Patent
Zhou et al.

(10) Patent No.: US 7,570,309 B2
(45) Date of Patent: Aug. 4, 2009

(54) METHODS FOR ADAPTIVE NOISE REDUCTION BASED ON GLOBAL MOTION ESTIMATION

(75) Inventors: Zhi Zhou, Irvine, CA (US); Yeong-Taeg Kim, Irvine, CA (US)

(73) Assignee: Samsung Electronics Co., Ltd., Suwon City (KR)

( * ) Notice: Subject to any disclaimer, the term of this patent is extended or adjusted under 35 U.S.C. 154(b) by 744 days.

(21) Appl. No.: 11/236,936

(22) Filed: Sep. 27, 2005

(65) Prior Publication Data

US 2007/0070250 A1     Mar. 29, 2007

(51) Int. Cl.
*H04N 5/21* (2006.01)
(52) U.S. Cl. .................. 348/701; 348/699; 348/700; 348/607; 375/240.16
(58) Field of Classification Search .......... 348/607, 348/620, 701, 699, 700; 375/240.16, 240.01; 382/236
See application file for complete search history.

(56) References Cited

U.S. PATENT DOCUMENTS 5,764,803 A * 6/1998 Jacquin et al. .......... 382/236
6,678,330 B1 * 1/2004 Kondo et al. .......... 375/240.24
2006/0050783 A1 * 3/2006 Le Dinh et al. .......... 375/240.2
2006/0103765 A1   5/2006 Zhou et al.

OTHER PUBLICATIONS

U.S. Appl. No. 11/100,369, filed Apr. 5, 2005, Z. Zhou et al.
U.S. Appl. No. 11/187,528, filed Jul. 21, 2005, Z. Zhou et al.

* cited by examiner

*Primary Examiner*—David L Ometz
*Assistant Examiner*—Jean W Désir
(74) *Attorney, Agent, or Firm*—Kenneth L. Sherman, Esq.; Michael Zarrabian, Esq.; Myers Andras Sherman LLP

(57) ABSTRACT

An improved temporal noise reduction method and system detects the global motion and adjusts the overall gain of the temporal filtering. Temporal noise reduction is applied to two video frames, wherein one video frame is the current input noisy frame, and the other video frame is a previous filtered frame stored in memory. In this method, noise estimation is first performed to estimate the noise variance/standard deviation in the input video sequence. Then, motion estimation is applied to obtain the motion vectors indicating relative motion between the pixels in the current noisy frame and the corresponding pixels in the previous noise-reduced frame. From such motion vectors, global motion estimation is applied to estimate the camera motion of the video sequence. If reliable global motion is obtained, the overall gain of the temporal filtering is reduced by adjusting the estimated noise level. Motion blur is thus prevented.

23 Claims, 3 Drawing Sheets

METHODS FOR ADAPTIVE NOISE REDUCTION BASED ON GLOBAL MOTION ESTIMATION

FIELD OF THE INVENTION

The present invention relates generally to video processing, and more particularly to noise reduction in video sequences.

BACKGROUND OF THE INVENTION

In many video display systems such as TV sets, video enhancement by noise reduction is performed in order to obtain essentially noise-free video sequences for display. Various noise reduction methods have been developed, but few are used in real products because such methods introduce unwanted artifacts into video frames. Most of the conventional noise reduction methods can be classified into three categories: spatial (two dimensional (2D)) noise reduction, temporal noise reduction, and three dimensional (3D) noise reduction (i.e., combination of 2D and temporal noise reduction).

Spatial noise reduction applies a filter (with a small local window) to every pixel of the current video frame. Such a filter is usually regarded as a convolution filter based on a kernel. Examples of such a filter are the mean filter, the Gaussian filter, the median filter and the sigma filter. Mean filtering is the simplest intuitive method for smoothing images and reducing noise, wherein the mean of a small local window is computed as the filtered result. Generally, a 3×3 square kernel is used, simplifying implementation. The mean filter, however, causes severe blurring of images.

Gaussian filtering uses a "bell-shaped" kernel to remove noise. Gaussian filtering is equivalent to a weighted average operation of the pixels in a small local window. However, Gaussian filtering also introduces blurring (severeness of the blurring can be controlled by the standard deviation of the Gaussian).

Median filtering is a nonlinear method. It sorts the pixels in a small local window and takes the median as the filtered result. The median filter does not create new unrealistic pixel values and preserves sharp edges. Also, an aliasing pixel value will not affect the filtered result. However, as the number of input pixels increases, the computational cost of sorting becomes too expensive for practical implementation.

To address such problems, some edge-oriented spatial filtering algorithms have been developed. These algorithms, however, require expensive hardware and introduce artifacts when edge-detection fails, especially in noisy images. Other algorithms convert images into frequency domain and reduce the high frequency components. Since image details are also high frequency components, such methods also blur the images.

Temporal noise reduction first examines motion information among the current video frame and its neighboring frames. It classifies pixels into motion region and non-motion region. In non-motion region, a filter is applied to the pixels in the current frame and its neighboring frames along the temporal axis. In motion region, the temporal filter is switched off to avoid motion blurring. Generally, temporal noise reduction is better in keeping the details and preserving edges than spatial noise reduction. The filtering performance, however, depends on the accuracy of the motion detection. Motion blur occurs if the motion detection fails. Such disadvantages limit applicability of temporal noise reduction.

There is, therefore, a need for a noise reduction method and system that reduces the motion blur.

BRIEF SUMMARY OF THE INVENTION

In one embodiment, the present invention provides an improved temporal noise reduction method and system that detects the global motion and adjusts the overall gain of the temporal filtering.

According to one embodiment of the present invention, temporal noise reduction is applied to two video frames, wherein one video frame is the current input noisy frame, and the other video frame is a previous filtered frame stored in memory. In this method, noise estimation is first performed to estimate the noise variance/standard deviation in the input video sequence. Then, motion estimation is applied to obtain the motion vectors indicating relative motion between the pixels in the current noisy frame and the corresponding pixels in the previous noise-reduced frame. From such motion vectors, global motion estimation is applied to estimate the camera motion of the video sequence. If reliable global motion is obtained, the overall gain of the temporal filtering is reduced by adjusting the estimated noise level. Motion blur is thus prevented.

These and other embodiments, features and advantages of the present invention will be apparent from the following specification taken in conjunction with the following drawings.

DETAILED DESCRIPTION OF THE INVENTION

In one embodiment, the present invention provides an improved temporal noise reduction method and system that detects the global motion and adjusts the overall gain of the temporal filtering. In one implementation, temporal noise reduction is applied to two video frames, wherein one video frame is the current input noisy frame, and the other video frame is a previous filtered frame stored in memory. In this method, noise estimation is first performed to estimate the noise variance/standard deviation in the input video sequence. Then, motion estimation is applied to obtain the motion vectors indicating relative motion between the pixels in the current noisy frame and the corresponding pixels in the previous noise-reduced frame. From such motion vectors, global motion estimation is applied to estimate the camera motion of the video sequence. If reliable global motion is obtained, the overall gain of the temporal filtering is reduced by adjusting the estimated noise level. Motion blur is thus prevented.

Figure 1:
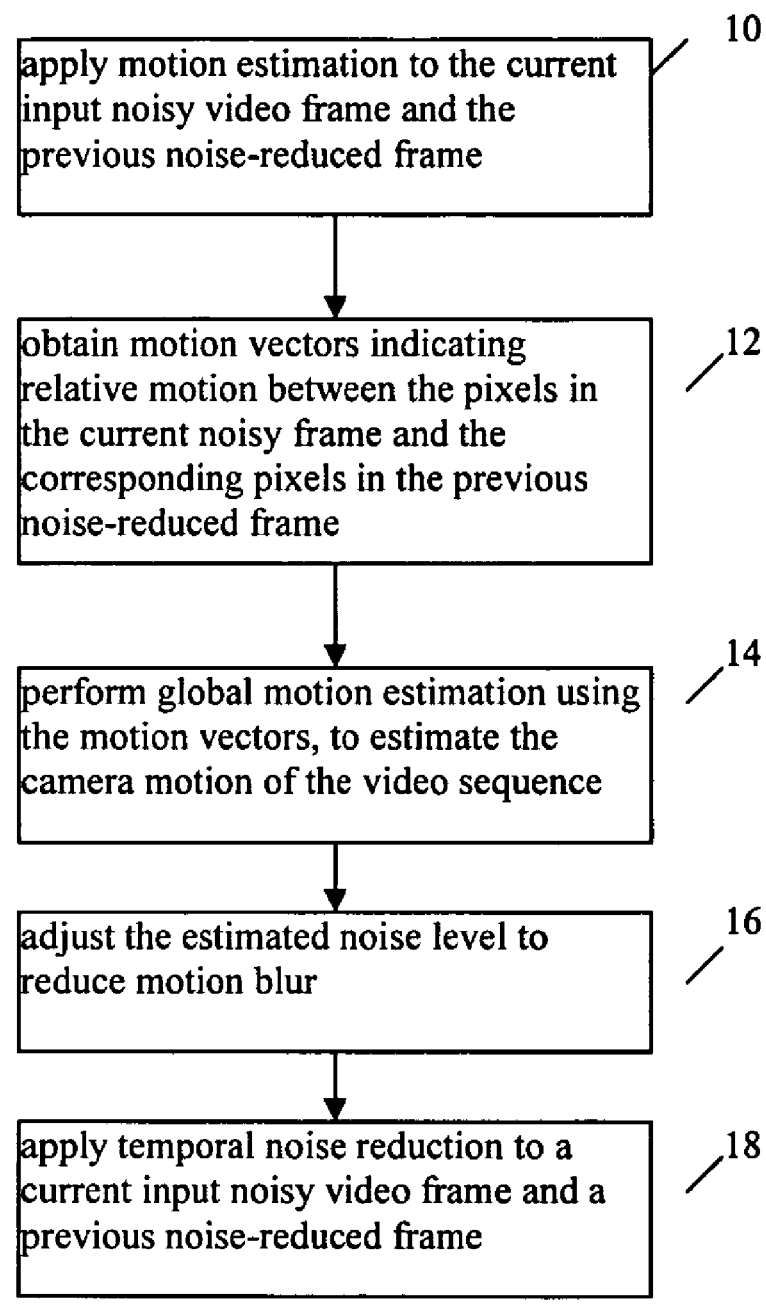
FIG. 1 shows a flowchart of an embodiment of a method of temporal noise reduction based on global motion estimation, according to the present invention.

FIG. 1 shows an example flowchart of an embodiment of the method of the present invention, including the steps of: applying motion estimation to a current input noisy video frame and a previous noise-reduced frame (step 10); obtaining motion vectors indicating relative motion between the pixels in the current noisy frame and the corresponding pixels in the previous noise-reduced frame (step 12); performing global motion estimation using the motion vectors, to estimate the camera motion of the video sequence (step 14); adjusting the estimated noise level to reduce motion blur (step 16); and applying temporal noise reduction to a current input noisy video frame and a previous noise-reduced frame using the estimated global motion to generate a noise-reduced output frame. The above steps are repeated for the next incoming frame in a video sequence.

Figure 2:
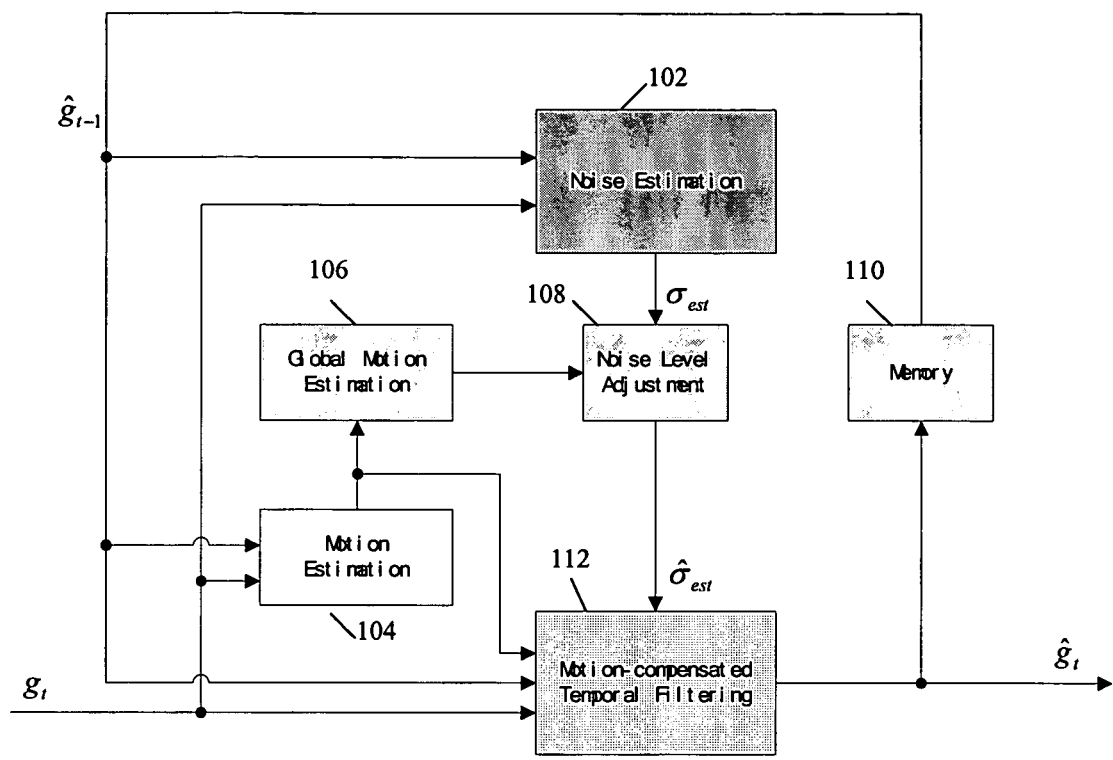
FIG. 2 shows a functional block diagram of an embodiment of a temporal noise reduction system based on global motion estimation, according to the present invention.
Figure 3:
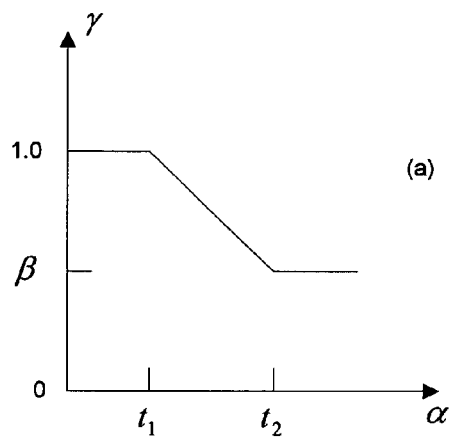
FIGS. 3(a)-(d) show examples of computing the noise level adjustment parameters, according to the present invention.
Figure 3:
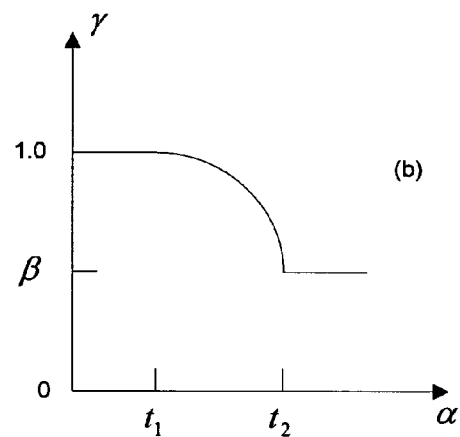
Figure 3:
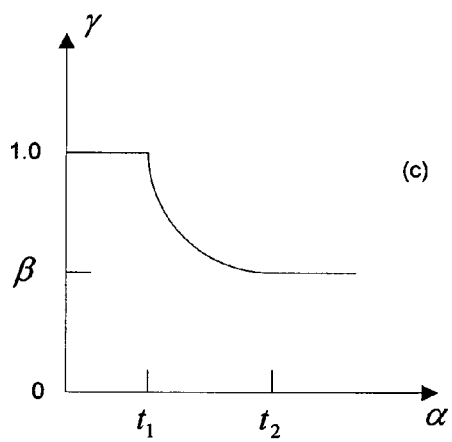
Figure 3:
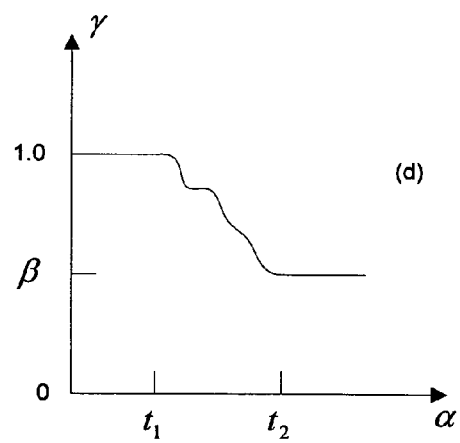

FIG. 2 shows a functional block diagram of an example motion compensated temporal noise reduction system 100 implementing the above method according to an embodiment of the present invention. In order to systematically describe the temporal noise reduction problem and said system embodiment of the present invention in FIG. 2, let $g_t$ denote the incoming video frame at time instant t and $g_t(i, j)$ denote the corresponding pixel value at the coordinates (i, j) where i represents the ordinate and j represents the abscissa. Assume the input video sequence is corrupted by independent, identically distributed additive and stationary zero-mean Gaussian noise with variance $\sigma_0^2$, that is, any pixel $g_t(i, j)$ can be denoted as:

$$g_t(i,j)=f_t(i,j)+n_t(i,j),$$

where $f_t(i, j)$ denotes the true pixel value without noise corruption and $n_t(i, j)$ is the Gaussian distributed noise component.

The system 100 in FIG. 2 comprises a noise estimation module 102, a motion estimation module 104, a global motion estimation module 106, a noise level adjustment module 108, a memory 110 and a motion-compensated temporal filtering module 112.

The noise estimation module 102 estimates the noise variance/standard deviation in the input video sequence g. The motion estimation module 104 estimates the motion vectors indicating relative motion between the pixels in the current noisy frame $g_t$ and the corresponding pixels in the previous noise-reduced frame $\hat{g}_{t-1}$. From such motion vectors, the global motion estimation module 106 estimates the camera motion of the video sequence. If reliable global motion is obtained, the noise level adjustment module 108 adjusts the noise variance/standard deviation, leading to less noise reduction in the motion-compensated temporal filtering module 112 which generates the noise-reduced frame $\hat{g}_t$. Therefore, less motion blur occurs. The memory 110 stores the noise-reduced frame $\hat{g}_t$ to be used as the previous noise-reduced frame for the next incoming frame.

The noise estimation unit 102 estimates the noise variance/standard deviation $\sigma_{est}$ in the video sequence. Commonly assigned patent applications Ser. No. 10/991,265 for "Methods to estimate noise variance from a video sequence", Ser. No. 11/100,369 for "Reliability estimation of temporal noise estimation", Ser. No. 11/187,528 "Extended method to estimate noise variance from a video sequence" incorporated herein by reference, provide examples of such noise estimation unit 104.

The motion estimation module 104 estimates relative motion vectors indicating relative motion between the pixels in the current noisy frame $g_t$ and the corresponding pixels in the previous noise-reduced frame $\hat{g}_{t-1}$. There is no restriction as to the motion estimation method used. An example of obtaining motion vectors is through a full search block matching algorithm which searches all locations in predefined searching areas in the frames and selects the position where the matching residual error is minimized. As will be recognized by those skilled in the art, other motion estimation methods, such as three step searching, diamond searching, hierarchical/multi-resolution motion estimation, object-based motion estimation, etc. can be also used.

The global motion estimation module 106 first computes the histogram of the motion vectors obtained from the motion estimation module 104. The motion vector with the maximum counts in the histogram is selected as the global motion vector. Let $(dx_g, dy_g)$ be the global motion vector, and $c_g$ be the count of the selected global motion vector. A parameter $\alpha$ is calculated as $\alpha = c_g/c_{total}$ wherein $c_{total}$ is the count of all the motion vectors. The larger the parameter $\alpha$, the more blocks/pixels follow the global motion, and the more reliable the global motion vector $(dx_g, dy_g)$. The global motion vector $(dx_g, dy_g)$ and the parameter $\alpha$ are then transferred to the noise level adjustment module 108 by the global motion estimation module 106.

The noise level adjustment module 108 first checks the global motion vector $(dx_g, dy_g)$. If the global motion vector $(dx_g, dy_g)$ is zero, indicating no camera motion, no adjustment is performed by the adjustment module 108. If the global motion vector $(dx_g, dy_g)$ is non-zero, then the estimated noise standard deviation $\sigma_{est}$ is adjusted as $\hat{\sigma}_{est} = \gamma \cdot \sigma_{est}$.

FIGS. 3(a)-(d) show examples of obtaining the adjustment parameter $\gamma$. Let $t_1$ and $t_2$ be two thresholds satisfying $0 \leq t_1 \leq t_2 \leq 1$. If $\alpha \leq t_1$, indicating that the detected camera motion is not reliable, we assume there is no global motion of the scene. Thus, $\gamma$ is set to 1.0 and no adjustment is performed. If $\alpha \geq t_2$, indicating that the detected camera motion is very reliable, $\gamma$ is set to $\beta$ ($0 \leq \beta < 1$) where in $\beta$ is a constant value. If $t_1 < \alpha < t_2$, $\gamma$ can be linearly interpolated as in FIG. 3(a) or non-linearly interpolated as in FIGS. 3(b)-(d). There is no limit on how $\gamma$ is interpolated as long as it is a monotonically decreasing function of $\alpha$.

The adjusted noise level (i.e., adjusted estimated noise standard deviation $\hat{\sigma}_{est}$) determined by noise level adjustment module 108 is provided to the motion-compensated temporal filtering module 112. Based on the adjusted noise level $\hat{\sigma}_{est}$, the motion-compensated temporal filtering module 112 applies motion-compensated temporal filtering to the current frame $g_t$ and the previous filtered frame $\hat{g}_{t-1}$ to obtain the noise reduced frame $\hat{g}_t$. Commonly assigned patent applications Ser. No. 11/106,998 for "A method of motion compensated temporal noise reduction" and Ser. No. 11/025,173, 2004, "A method of temporal noise reduction in video sequence", incorporated herein by reference, provide examples of such a noise reduction method. Such noise reduction is noise-adaptive. If the detected noise level is higher, more noise reduction will be performed. If the global motion vector is detected as reliable and the noise level is reduced in the noise level adjustment module 108, less noise reduction will be performed to prevent motion blur.

As those skilled in the art will recognize, the present invention can be used on both progressive and interlaced videos. The even and odd fields in an interlaced video can be processed as two separate progressive video sequences; or the fields can be merged into a single frame prior to be processed.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of video noise reduction in a sequence of video frames, comprising:
   applying motion estimation to the current input noisy video frame and a previous noise-reduced frame, to obtain motion vectors indicating relative motion between the pixels in the current noisy frame and the corresponding pixels in the previous noise-reduced frame;

performing global motion estimation including computing a histogram of the motion vectors and determining a ratio of a motion vector with maximum counts in the histogram to a count of all motion vectors in the histogram, to estimate the global motion vector of the video sequence; and determining a noise-reduced frame output based on the global motion vector.

2. The method of claim 1 further comprising applying temporal noise reduction to the current input noisy video frame $g_t$ and the previous noise-reduced frame $\hat{g}_{t-1}$ using the estimated global motion vector to determine a noise-reduced frame $\hat{g}_t$ output.

3. The method of claim 2 further including reducing motion blur by determining if reliable global motion vector is obtained, and if so, reducing the overall gain of the temporal filtering by adjusting the estimated noise level, thereby reducing motion blur.

4. The method of claim 3 wherein the performing global motion estimation further includes selecting a motion vector with maximum counts in the histogram as the global motion vector.

5. The method of claim 4 wherein the performing global motion estimation further including calculating a parameter $\alpha$ as $\alpha = c_g/c_{total}$, wherein $c_g$ is the count of the selected global motion vector $(dx_g, dy_g)$ in the histogram and $c_{total}$ is the count of all the motion vectors, wherein the larger the parameter $\alpha$, the more pixels follow the global motion, and the more reliable the global motion vector $(dx_g, dy_g)$.

6. The method of claim 5 further including performing noise level adjustment based on the parameter $\alpha$ to reduce motion blur.

7. The method of claim 6 further comprising based on the parameter $\alpha$, determining if a reliable global motion vector is obtained, and if so, reducing the overall gain of the temporal filtering by adjusting the estimated noise level using an adjustment parameter, thereby reducing motion blur.

8. The method of claim 7 further including:
if the global motion vector $(dx_g, dy_g)$ is zero, then indicating no camera motion, wherein no adjustment is performed.

9. The method of claim 8 further including:
if the global motion vector $(dx_g, dy_g)$ is non-zero, then adjusting the estimated noise standard deviation $\sigma_{est}$ as $\hat{\sigma}_{est} = \gamma \cdot \sigma_{est}$, wherein $\hat{\sigma}_{est}$ is the adjusted estimated noise standard deviation and $\gamma$ is an adjustment parameter.

10. The method of claim 9 further including determining the adjustment parameter $\gamma$ by:
if $\alpha \leq t_1$, then indicating that the detected global motion vector is not reliable and setting $\gamma=1$ wherein no adjustment is performed;
if $\alpha \geq t_2$, then indicating that the detected global motion vector is very reliable, and setting $\gamma = \beta$ ($0 \leq \beta < 1$) wherein $\beta$ is a pre-defined value; and
otherwise, if $t_1 < \alpha < t_2$, then interpolating $\gamma$ using a monotonically decreasing function of $\alpha$,
wherein $t_1$ and $t_2$ are two thresholds satisfying $0 \leq t_1 \leq t_2 \leq 1$.

11. A video processing system for video noise reduction in a sequence of video frames, comprising:
a noise estimation module that estimates the noise level $\sigma_{est}$ in the input video sequence g;
a motion estimation module that estimates motion vectors indicating relative motion between the pixels in the current noisy frame $g_t$, and the corresponding pixels in the previous noise-reduced frame $\hat{g}_{t-1}$;
a global motion estimation module that computes a histogram of the motion vectors and determines a ratio of a motion vector with maximum counts in the histogram to a count of all motion vectors in the histogram to estimate the global motion of the video sequence and estimate the reliability of the global motion vector;
a noise level adjustment module that adjust the noise level based on the reliability of the global motion vector; and
a motion-compensated temporal filtering module that filters the current input noisy frame based on the adjusted noise level.

12. The system of claim 11 further comprising a noise reduction module that applies temporal noise reduction to the current input noisy video frame $g_t$ and the previous noise-reduced frame $\hat{g}_{t-1}$ using the estimated global motion to determine a noise reduced-frame $\hat{g}_t$ output.

13. The system of claim 12 further including means for reducing motion blur by determining if reliable global motion is obtained, and if so, reduces the overall gain of the temporal filtering by adjusting the estimated noise level, thereby reducing motion blur.

14. The system of claim 11 wherein the global motion estimation module further utilizes the histogram to select a motion vector with maximum counts as the global motion vector.

15. The system of claim 14 wherein the global motion estimation module calculates a parameter $\alpha$ as $\alpha = c_g/c_{total}$, wherein $c_g$ is the count of the selected global motion vector $(dx_g, dy_g)$ in the histogram and $c_{total}$ is the count of all the motion vectors, wherein the larger the parameter $\alpha$, the more pixels follow the global motion, and the more reliable the the global motion vector $(dx_g, dy_g)$.

16. The system of claim 15 wherein the adjustment module performs noise level adjustment based on the parameter $\alpha$ to reduce motion blur.

17. The system of claim 16 wherein the adjustment module uses the parameter $\alpha$ to determine if a reliable global motion vector is obtained, and if so, reduces the overall gain of the temporal filtering by adjusting the estimated noise level using an adjustment parameter, thereby reducing motion blur.

18. The system of claim 17 wherein the adjustment module determines if the global motion vector $(dx_g, dy_g)$ is zero, and if so, indicates no camera motion, wherein no adjustment is performed.

19. The system of claim 18 wherein the adjustment module determines if the global motion vector $(dx_g, dy_g)$ is non-zero, and if so, adjusts the estimated noise standard deviation $\sigma_{est}$ as $\hat{\sigma}_{est} = \gamma \cdot \sigma_{est}$, wherein $\hat{\sigma}_{est}$ is the adjusted estimated noise standard deviation and $\gamma$ is an adjustment parameter.

20. The system of claim 19 wherein the adjustment module determines the adjustment parameter $\gamma$ by:
if $\alpha \leq t_1$, then indicating that the detected global motion vector is not reliable and setting $\gamma=1$ wherein no adjustment is performed;
if $\alpha \geq t_2$, then indicating that the detected global motion vector is very reliable, and setting $\gamma = \beta$ ($0 \leq \beta < 1$) wherein $\beta$ is a pre-defined value; and
otherwise, if $t_1 < \alpha < t_2$, then interpolating $\gamma$ using a monotonically decreasing function of $\alpha$,
wherein $t_1$ and $t_2$ are two thresholds satisfying $0 \leq t_1 \leq t_2 \leq 1$.

21. The system of claim 18 wherein the adjustment module determines an adjustment parameter $\gamma$ by:
if $\alpha \leq t_1$, then indicating that the detected camera motion is not reliable and no global motion of the scene, and setting $\gamma=1$ wherein no adjustment is performed;

if $\alpha \geq t_2$, then indicating that the detected camera motion is very reliable, and setting $\gamma=\beta$ ($0 \leq \beta < 1$) where in $\beta$ is a constant value; and otherwise, if $t_1 < \alpha < t_2$, then interpolating $\gamma$ using a monotonically decreasing function of $\alpha$, wherein $t_1$ and $t_2$ are two thresholds satisfying $0 \leq t_1 \leq t_0 \leq 1$.

22. A method of video noise reduction in a sequence of video frames, comprising the steps of:

estimating the noise level in the video sequence;

applying motion estimation to the current input noisy video frame and a previous noise-reduced frame, to obtain motion vectors indicating relative motion between the pixels in the current noisy frame and the corresponding pixels in the previous noise-reduced frame;

performing global motion estimation including computing histogram of the motion vectors and determining a ration of a motion vector with maximum counts in the histogram to a count of all motion vectors in the histogram, to estimate the global motion vector of the video sequence and calculating the reliability of the global motion vector;

adjusting the noise level based on the reliability of the global motion vector; and applying motion-compensated temporal filtering based on the adjusted noise level to generate a noise-noise reduced frame.

23. The method of claim 22 wherein the adjustment module determines the adjustment parameter $\gamma$ by:

if $\alpha \leq t_1$, then indicating that the detected camera motion is not reliable and no global motion of the scene, and setting $\gamma=1$ wherein no adjustment is performed;

if $\alpha \geq t_2$, then indicating that the detected camera motion is very reliable, and setting $\gamma=\beta$ ($0 \leq \beta < 1$) where in $\beta$ is a constant value; and otherwise, if $t_1 < \alpha < t_2$, then interpolating $\gamma$ using a monotonically decreasing function of $\alpha$, wherein $t_1$ and $t_2$ are two thresholds satisfying $0 \leq t_1 \leq t_0 \leq 1$.

* * * * *